(12) United States Patent
Yamasaki

(10) Patent No.: US 10,228,034 B2
(45) Date of Patent: Mar. 12, 2019

(54) ELECTRIC LINEAR MOTION ACTUATOR AND ELECTRIC DISK BRAKE SYSTEM

(71) Applicant: NTN CORPORATION, Osaka (JP)

(72) Inventor: Tatsuya Yamasaki, Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/423,440

(22) PCT Filed: Aug. 27, 2013

(86) PCT No.: PCT/JP2013/072834
§ 371 (c)(1),
(2) Date: Feb. 24, 2015

(87) PCT Pub. No.: WO2014/034648
PCT Pub. Date: Mar. 6, 2014

(65) Prior Publication Data
US 2015/0316112 A1 Nov. 5, 2015

(30) Foreign Application Priority Data
Aug. 31, 2012 (JP) ................................. 2012-191273

(51) Int. Cl.
*F16H 25/22* (2006.01)
*F16D 65/14* (2006.01)
(Continued)

(52) U.S. Cl.
CPC ............. *F16D 65/14* (2013.01); *F16D 65/18* (2013.01); *F16H 25/2252* (2013.01);
(Continued)

(58) Field of Classification Search
CPC .. F16D 2121/24; F16D 65/18; F16D 2125/40; F16D 2125/50; F16H 25/2252
(Continued)

(56) References Cited

U.S. PATENT DOCUMENTS 3,861,221 A * 1/1975 Stanley ............... F16H 25/2266
74/25
3,965,761 A 6/1976 Stanley
(Continued)

FOREIGN PATENT DOCUMENTS

CN 101675271 3/2010
JP 50-128058 10/1975
(Continued)

OTHER PUBLICATIONS

Extended European Search Report dated Jan. 4, 2015 in corresponding European Application No. 13832265.6.
(Continued)

*Primary Examiner* — Bradley T King
*Assistant Examiner* — Stephen M Bowes
(74) *Attorney, Agent, or Firm* — Wenderoth, Lind & Ponack, L.L.P.

(57) ABSTRACT

An electric linear motion actuator includes an outer ring member provided around a central shaft, and planetary rollers disposed between the central shaft and the outer ring member. One of the central shaft and the outer ring member serves as an input member which is rotatable and immovable in the axial direction and rotated by an electric motor, while the other serves as an output member which is rotationally stationary and movable in the axial direction. The input member has a peripheral surface formed with a plurality of annular ribs which are equal in pitch. Each planetary roller has a radially outer surface formed with annular grooves which are equal in pitch to the annular ribs and in which the annular ribs are engaged. The output member has a peripheral surface formed with a helical rib which is equal in pitch to the annular grooves of the planetary rollers.

12 Claims, 11 Drawing Sheets

(51) Int. Cl.
*F16D 65/18* (2006.01)
*F16D 125/40* (2012.01)
*F16H 25/20* (2006.01)
*F16D 121/24* (2012.01)
*F16D 125/48* (2012.01)
*F16D 125/50* (2012.01)

(52) U.S. Cl.
CPC ...... *F16D 2121/24* (2013.01); *F16D 2125/40* (2013.01); *F16D 2125/48* (2013.01); *F16D 2125/50* (2013.01); *F16H 2025/2075* (2013.01); *F16H 2025/2081* (2013.01); *F16H 2025/2276* (2013.01); *Y10T 74/18576* (2015.01)

(58) Field of Classification Search
USPC ................. 74/424.92; 475/149, 150, 183
See application file for complete search history.

(56) References Cited

U.S. PATENT DOCUMENTS

| | | | | |
|---|---|---|---|---|
| 4,033,194 A * | 7/1977 | Stanley | ............ | F16H 25/2266 74/424.92 |
| 4,037,893 A * | 7/1977 | Perrin | ............ | F16H 25/2252 384/550 |
| 4,048,867 A * | 9/1977 | Saari | ............ | F16H 25/2252 74/424.92 |
| 4,050,319 A * | 9/1977 | Stanley | ............ | F16H 25/2266 74/424.92 |
| 6,098,479 A * | 8/2000 | Hoermansdoerfer | ............ | B60T 13/741 475/333 |
| 6,230,855 B1 * | 5/2001 | Holding | ............ | F16D 65/18 188/158 |
| 6,305,508 B1 * | 10/2001 | Schumann | ............ | B60T 13/741 188/72.8 |
| 6,325,180 B1 * | 12/2001 | De Vries | ............ | F16H 25/2252 188/162 |
| 6,536,561 B1 * | 3/2003 | Keller | ............ | B60T 1/062 188/162 |
| 2003/0102192 A1 | 6/2003 | Kapaan | | |
| 2005/0160856 A1 * | 7/2005 | Sugitani | ............ | F16H 25/2252 74/424.92 |
| 2008/0196529 A1 | 8/2008 | Sugitani | | |
| 2009/0288509 A1 | 11/2009 | Hori et al. | | |
| 2010/0084230 A1 | 4/2010 | Yamasaki et al. | | |
| 2011/0247904 A1 | 10/2011 | Yamasaki | | |
| 2013/0048443 A1 | 2/2013 | Muramatsu et al. | | |
| 2013/0292215 A1 | 11/2013 | Eguchi et al. | | |

FOREIGN PATENT DOCUMENTS

| | | |
|---|---|---|
| JP | 54-65262 | 5/1979 |
| JP | 09-250579 | 9/1997 |
| JP | 2005-133863 | 5/2005 |
| JP | 2008-002587 | 1/2008 |
| JP | 2010-090959 | 4/2010 |
| JP | 2011-241851 | 12/2011 |
| JP | 2012-057681 | 3/2012 |
| WO | 2012/098977 | 7/2012 |

OTHER PUBLICATIONS

International Search Report dated Nov. 19, 2013 in International (PCT) Application No. PCT/JP2013/072834.

Written Opinion of the International Searching Authority dated Nov. 19, 2013 in International (PCT) Application No. PCT/JP2013/072834 (with English translation).

* cited by examiner

ELECTRIC LINEAR MOTION ACTUATOR AND ELECTRIC DISK BRAKE SYSTEM

TECHNICAL FIELD

This invention relates to an electric linear motion actuator for linearly driving a driven member such as a brake pad, and an electric disk brake system using such an electric linear motion actuator.

BACKGROUND ART

An electric linear motion actuator, which is driven by an electric motor, includes a motion converter mechanism configured to convert the rotary motion of the rotor shaft of the electric motor to a linear motion of an axially movably supported driven member.

Ball-screw mechanisms and ball-ramp mechanisms are used as the motion converter mechanisms of known electric linear motion actuators. Such motion converter mechanisms can increase power to some extent, but cannot increase power to a level required in e.g. an electric disk brake system.

Thus, in an electric linear motion actuator in which one of the above-described motion converter mechanisms is used, it is necessary to mount a separate speed reduction mechanism such as a planetary gear mechanism to increase power to a sufficient level. The addition of such a speed reduction mechanism, however, increases complexity and size of the electric linear motion actuator.

In order to avoid this problem, the applicant of the present invention proposed electric linear motion actuators which are capable of increasing power to a sufficient level without mounting a speed reduction mechanism, and thus which are suitable for use in electric disk brake systems, of which a linear stroke is relatively short, in the below-identified Patent documents 1 and 2.

The electric linear motion actuator disclosed in either of Patent documents 1 and 2 includes planetary rollers disposed between a rotary shaft rotated by an electric motor and an axially movably supported outer ring member such that when the rotary shaft is rotated, the planetary rollers revolve around the rotary shaft while rotating about their respective axes due to frictional contact between the planetary rollers and the rotary shaft. The outer ring member has on its radially inner surface a helical rib which is engaged in helical grooves or circumferential grooves formed on the radially outer surfaces of the planetary rollers such that when the planetary rollers revolve around the rotary shaft, the outer ring member is moved in the axial direction.

PRIOR ART DOCUMENTS

Patent Documents

Patent document 1: JP Patent Publication 2010-90959A
Patent document 2: JP Patent Publication 2012-57681A

SUMMARY OF THE INVENTION

Object of the Invention

The electric linear motion actuator disclosed in either of Patent documents 1 and 2 is configured such that an axial load applied to the outer ring member is supported by a shaft support member through the planetary rollers, a carrier member rotatably supporting the planetary rollers, and a support member mounted behind the carrier member. Thus, it is necessary to mount thrust bearings between the respective planetary rollers and the carrier member and between the support member and the shaft support member. These large number of thrust bearings increase the cost of the electric linear motion actuator. It is therefore desired to reduce the cost of the electric linear motion actuator.

Also, in order to prevent uneven loads from being applied to the respective thrust bearings, it is necessary to increase the rigidities of the carrier member, support member and shaft support member by increasing their sizes. This increases the size of the entire electric linear motion actuator. It is therefore desired to reduce the size of the electric linear motion actuator.

The electric linear motion actuator disclosed in either of Patent documents 1 and 2 is further configured such that the planetary rollers are brought into contact at their radially outer surfaces with the rotary shaft, and also brought into contact with the outer ring member at the engaging portions of the helical grooves or circumferential grooves formed on the radially outer surfaces thereof that are in engagement with the helical rib formed on the radially inner surface of the outer ring. Since the contact radius of the portion of each planetary roller that contacts the rotary shaft is not equal to the contact radius of the portion of each planetary roller that contacts the outer ring member, slippage occurs at the contact portions between the planetary rollers and the rotary shaft or at the contact portions between the planetary rollers and the outer ring member. Such slippage increases torque loss. It is therefore desired to reduce such torque loss.

An object of the present invention is to reduce the number of thrust bearings mounted in an electric linear motion actuator including planetary rollers to receive thrust loads, and to reduce torque loss.

Means for Achieving the Object

In order to achieve this object, the present invention provides an electric linear motion actuator comprising a central shaft, an outer ring member provided around the central shaft, and a plurality of planetary rollers disposed between the central shaft and the outer ring member, wherein one of the central shaft and the outer ring member serves as an input member which is rotatable and immovable in an axial direction and is configured to be rotated by an electric motor, while the other of the central shaft and the outer ring member serves as an output member which is rotationally stationary and movable in the axial direction, wherein the input member has a peripheral surface formed with a plurality of annular ribs which are equal in pitch, or a helical rib, wherein each of the planetary rollers has a radially outer surface formed with annular grooves which are equal in pitch to the annular ribs of the input member, and in which the annular ribs of the input member are engaged, or formed with a helical groove which are equal in pitch and lead angle, and opposite in helix direction, to the helical rib of the input member, and in which the helical rib of the input member is engaged, and wherein the output member has a peripheral surface which is formed, if the annular grooves are formed on the radially outer surfaces of the planetary rollers, with a helical rib which is equal in pitch to the annular grooves of the planetary rollers, and if the helical grooves are formed on the radially outer surfaces of the planetary rollers, with a helical rib which is equal in pitch to, and different in lead angle from, the helical grooves of the planetary rollers, or with annular ribs which are equal in pitch to the helical grooves of the planetary rollers.

The present invention further provides an electric disk brake system comprising an electric linear motion actuator which linearly drives a brake pad to press the brake pad against a disk rotor, thereby applying a braking force to the disk rotor, wherein the electric linear motion actuator comprises the electric linear motion actuator according to the present invention.

In this electric linear motion actuator, since the annular ribs of the input member are fitted in the annular grooves of the planetary rollers, or the helical rib of the input member is fitted in the helical grooves of the planetary rollers which are opposite in the helix direction to the helical rib, when the input member is rotated by the electric motor, the planetary rollers revolve around the central shaft while rotating about their respective axes without axially moving relative to the input member.

Further, since the helical rib or the annular ribs formed on the output member are engaged in the annular grooves or the helical grooves of the planetary rollers, and the helical rib or annular ribs are different in lead angle from the annular grooves or helical grooves, when the planetary rollers revolve around the central shaft, the output member moves in the axial direction.

By using the electric linear motion actuator according to this invention in an electric disk brake system, when the output member is moved in the axial direction, the brake pad is driven linearly and pressed against the disk rotor, so that the disk rotor is braked.

When the brake pad is pressed against the disk rotor, a reaction force is applied to the output member. The reaction force (axial load) applied to the output member acts on the planetary rollers. Since the annular ribs of the input member are fitted in the annular grooves of the planetary rollers, or the helical rib of the input member is fitted in the helical grooves of the planetary rollers which are opposite in helix direction to the helical rib, the axial load applied to the planetary rollers is supported at the fitting portions between the planetary rollers and the input member, so that the planetary rollers remain axially stationary.

Since the axial load applied to the planetary rollers is supported at the fitting portions between the annular grooves and the annular ribs, or at the fitting portions between the helical grooves and the helical rib, it is not necessary to rotatably support the planetary rollers with thrust bearings. By dispensing with thrust bearings, it is possible to correspondingly reduce the cost and size of the linear motion actuator.

The electric linear motion actuator according to the present invention may be configured such that the input member is formed with annular ribs engaged in annular grooves formed in the planetary rollers, or formed with a helical rib engaged in helical grooves formed in the planetary rollers and opposite in helix direction to the helical rib; the output member is formed with a helical rib engaged in the annular grooves of the planetary rollers, or formed with a helical rib or annular ribs engaged in the helical grooves of the planetary rollers; and the contact radius of the portion of each planetary roller that is brought into contact with the input member is equal to the radius of the portion of each planetary roller that is brought into contact with the outer member. By making the above two contact radii equal to each other, it is possible to prevent slippage at the respective contact portions, thus reducing torque loss.

Preferably, the annular grooves or the helical grooves of the planetary rollers have inclined side surfaces which are configured to create radial components from an axial load applied to the output member, the radial components tending to press the respective planetary rollers against the input member. With this arrangement, it is possible to increase the contact pressure between the planetary rollers and the input member, thus making it possible to reliably rotate the planetary rollers when the input member is rotated due to contact therebetween. The side surfaces of the grooves of the planetary rollers and/or the side surfaces of the rib or ribs of the input member or the output member are preferably convex curved surface to prevent the side surfaces of the grooves from coming into contact with the side surfaces of the rib or ribs at their distal or proximal ends, thereby preventing abnormal wear of, or damage to, the side surfaces.

The electric linear motion actuator may further comprise a preload applying means pressing the planetary rollers against the peripheral surface of the input member, thereby applying a preload to a contact portion between each of the planetary rollers and the input member. The preload applying means makes it possible to more reliably rotate the planetary rollers when the input member is rotated due to contact therebetween.

The preload applying means may be of any of the below structures I to V.

Structure I: A preload applying means comprising an opposed pair of tapered rings provided at first axial ends and second axial ends, of the planetary rollers, respectively, so as to be movable relative to each other, and each having a tapered peripheral surface facing the input member; first tapered shaft portions provided at first axial ends of support pins inserted through center holes of the respective planetary rollers, said first tapered shaft portions being kept in contact with and guided by one of the tapered peripheral surfaces; second tapered shaft portions provided at second axial ends of the support pins and kept in contact with and guided by the other of the tapered peripheral surfaces; and an elastic member biasing one of the tapered rings toward the other of the tapered rings.

Structure II: A preload applying means comprising an opposed pair of annular plates provided at first axial ends and second axial ends, of the planetary rollers, respectively, so as to be movable relative to each other, and each formed with radially elongated guide holes, wherein support pins are inserted through center holes of the respective planetary rollers, the support pins having first end portions slidably fitted in the respective guide holes of one of the annular plates, and having second end portions slidably fitted in the respective guide holes of the other of the annular plates, wherein at least the first and second end portions of the support pins, or closed end surfaces of the guide holes are formed with tapered surfaces, and wherein the preload applying means further comprises an elastic member biasing one of the annular plates toward the other of the annular plates.

Structure III: A preload applying means comprising an opposed pair of tapered rings provided at first axial ends and second axial ends, of the planetary rollers, respectively, so as to be movable relative to each other, and each having a tapered peripheral surface facing the input member; first tapered shaft portions provided at first axial end surfaces of the respective planetary rollers and kept in contact with and guided by one of the tapered peripheral surfaces; second tapered shaft portions provided at second axial end surfaces of the planetary rollers and kept in contact with and guided by the other of the tapered peripheral surfaces; and an elastic member biasing one of the tapered rings toward the other of the tapered rings.

Structure IV: A preload applying means comprising an opposed pair of annular plates provided at first axial ends and second axial ends, of the planetary rollers, respectively, so as to be movable relative to each other, wherein one of the annular plates includes first tapered pins inserted in tapered holes formed in first axial end surfaces of the respective planetary rollers, and the other of the annular plates includes second tapered pins inserted in tapered holes formed in second axial end surfaces of the respective planetary rollers, the first and second tapered pins rotatably supporting the respective planetary rollers, and wherein the preload applying means further comprises an elastic member biasing one of the annular plates toward the other of the annular plates.

Structure V: A preload applying means comprising an opposed pair of annular plates provided at first axial ends and second axial ends, of the planetary rollers, respectively, and each formed with radially elongated guide holes, wherein support pins are inserted through center holes of the respective planetary rollers, the support pins having first end portions slidably fitted in the respective guide holes of one of the annular plates, and having second end portions slidably fitted in the respective guide holes of the other of the annular plates, and wherein the preload applying means further comprises an elastic member biasing the support pins toward the input member.

The elastic member used in the preload applying means having any of structures I to V may be a disk spring or a coil spring.

The disk brake system according to the present invention may further comprise a thrust bearing configured to support an axial load applied from the output member to the input member through the planetary rollers when a braking force is applied to the disk rotor, and a load sensor provided behind the thrust bearing. With this arrangement, it is possible to detect the magnitude of the braking force applied to the disk rotor.

The load sensor may be a magnetostriction sensor, a strain detecting load sensor, or a magnetic load sensor.

Advantages of the Invention

Since the electric linear motion actuator according to the present invention is configured such that an axial load applied to the planetary rollers and the input member from the output member is supported at the contact portions between the annular grooves formed on the planetary rollers and the annular ribs provided on the input member, or at the contact portions between the helical grooves formed on the planetary rollers and the helical rib provided on the input member, it is not necessary to use thrust bearings to rotatably support the planetary rollers. This reduces the cost and size of the linear motion actuator.

Since the contact radius of the portion of each planetary roller that is brought into contact with the input member is equal to the contact radius of the portion of each planetary roller that is brought into contact with the output member, slippage does not occur at these contact portions. This reduces torque loss.

BRIEF DESCRIPTION OF THE DRAWINGS

FIG. 8($b$) is a sectional view taken along line VIII-VIII of FIG. 8($a$).
FIG. 9($d$) is a sectional view taken along line IX-IX of FIG. 9($c$).
FIG. 10($f$) is a sectional view taken along line X-X of FIG. 10($e$).
FIG. 11($h$) is a sectional view taken along line XI-XI of FIG. 11($g$).

BEST MODE FOR EMBODYING THE INVENTION

Figure 1:
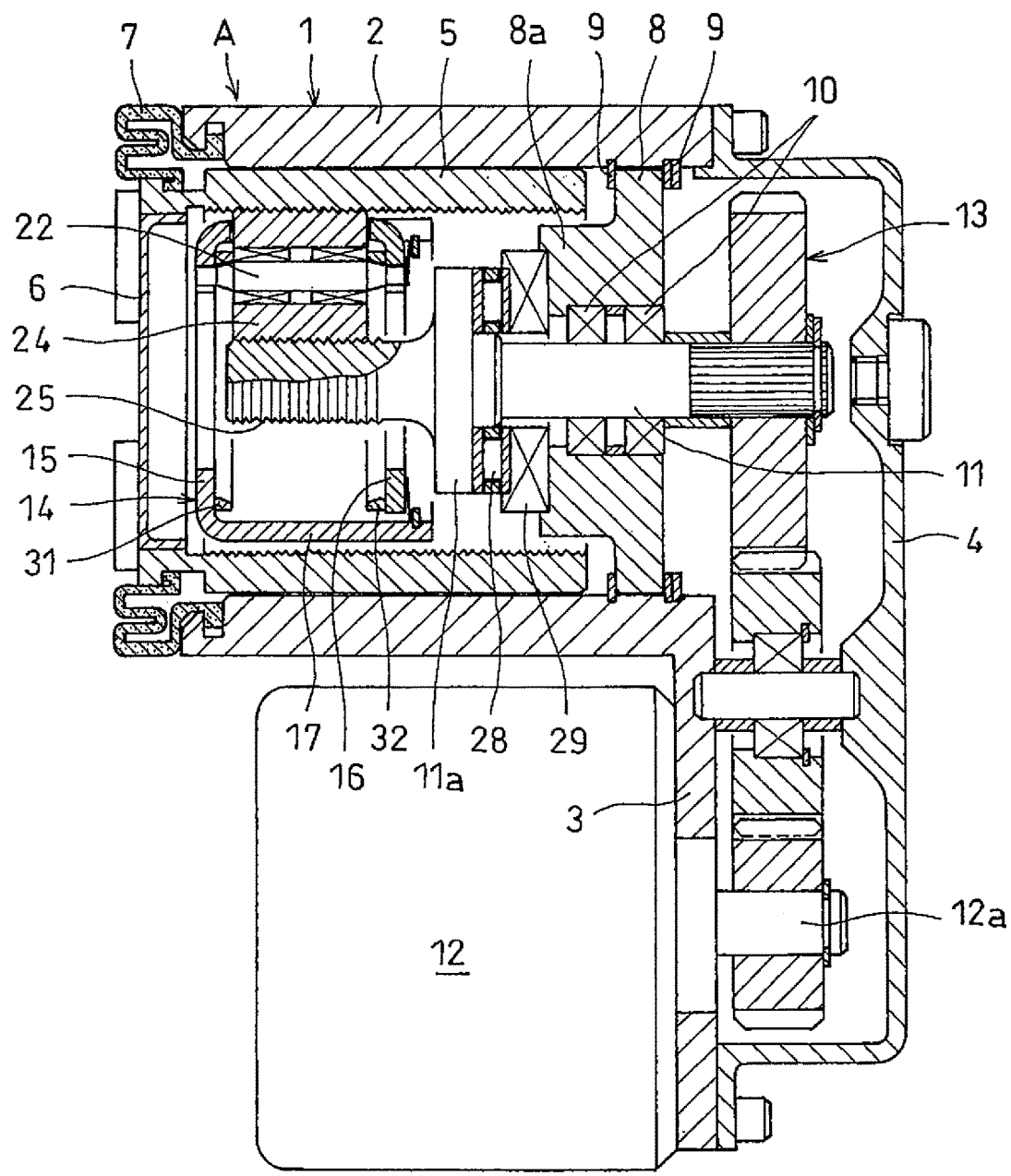
FIG. 1 is a vertical sectional view of an electric linear motion actuator embodying the present invention.

Embodiments of the present invention are now described with reference to the drawings. FIGS. 1-7 show an electric linear motion actuator A embodying the present invention. As shown in FIG. 1, the actuator A includes a housing 1 having a guide tube 2 and a base plate 3 radially outwardly extending from one end, which is an open end, of the guide tube 2. The opening of the guide tube 2 at the one end thereof and the outer side surface of the base plate 3 are covered by a cover 4 fixed to the housing 1 by bolts.

An outer ring member 5 as an output member is mounted in the guide tube 2. The outer ring member 5 is supported so as to be axially movable and rotationally fixed. The outer ring member 5 has an opening at the other end which is closed by a seal cover 6 mounted thereto. A bellows 7 has one end thereof coupled to the outer periphery of the outer ring member 5 at the other end thereof. The bellows 7 has the other end thereof coupled to the other end of the guide tube 2. The bellows 7 thus closes the opening of the guide tube 2 at the other end thereof.

A shaft support member 8 is mounted in the guide tube 2 on the side of the one axial end of the outer ring member 5. The shaft support member 8 is a disk-shaped member having a boss portion 8$a$ at its center. The shaft support member 8 is prevented from axial movement by snap rings 9 mounted on the radially inner surface of the guide tube 2.

Two rolling bearings 10 are mounted in the boss portion 8$a$ of the shaft support member 8 so as to be axially spaced apart from each other. The rolling bearings 10 rotatably support a central shaft 11 as an input member, which extends along the center axis of the outer ring member 5.

An electric motor 12 is supported on the base plate 3 of the housing 1. The electric motor 12 has a rotor shaft 12$a$ whose rotation is transmitted to the central shaft 11 after being reduced in speed by a gear transmission mechanism 13 mounted in the cover 4.

A carrier member 14 is disposed between the central shaft 11 and the outer ring member 5 and around the central shaft 11. As shown in FIGS. 2 to 5, the carrier member 14 includes a pair of axially opposed annular plates 15 and 16. The annular plate 15 is integrally formed with a cylindrical portion 17 at its outer periphery. The cylindrical portion 17 is formed with a plurality of axially elongated pockets 18 so as to be circumferentially equidistantly spaced apart from each other.

The other annular plate 16 has L-shaped guide pieces 19 at the outer peripheral portion thereof so as to face the respective pockets 18. The guide pieces 19 are slidably fitted in the respective pockets 18 such that the annular plate 16 is movable toward the annular plate 15. A snap ring 20 is mounted on the inner periphery of the cylindrical portion 17 so as to prevent the annular plate 16 from being pulled out of the cylindrical portion 17.

Each of the annular plates 15 and 16 is formed with radially elongated guide holes 21 in the form of cutouts in the inner periphery thereof. The guide holes 21 of each of the annular plates 15 and 16 are equal in number to the pockets 18 and are circumferentially equidistantly spaced apart from each other. Further, the guide holes 21 of each of the annular plates 15 and 16 are at the same angular positions as the respective pockets 18. A support pin 22 has the respective ends thereof fitted in each axially opposed pair of the guide holes 21 of the annular plates 15 and 16, respectively.

The support pins 22 are movable in the radial direction along the respective guide holes 21. Each of the planetary rollers 24 is rotatably supported on one of the support pins 22 through bearings 23 fitted around the support pin 22.

The planetary rollers 24 are disposed around the central shaft 11 so as to be circumferentially equidistantly spaced apart from each other. The planetary rollers 24 protrude from the respective pockets 18 beyond the radially outer surface of the cylindrical portion 17.

Figure 2:
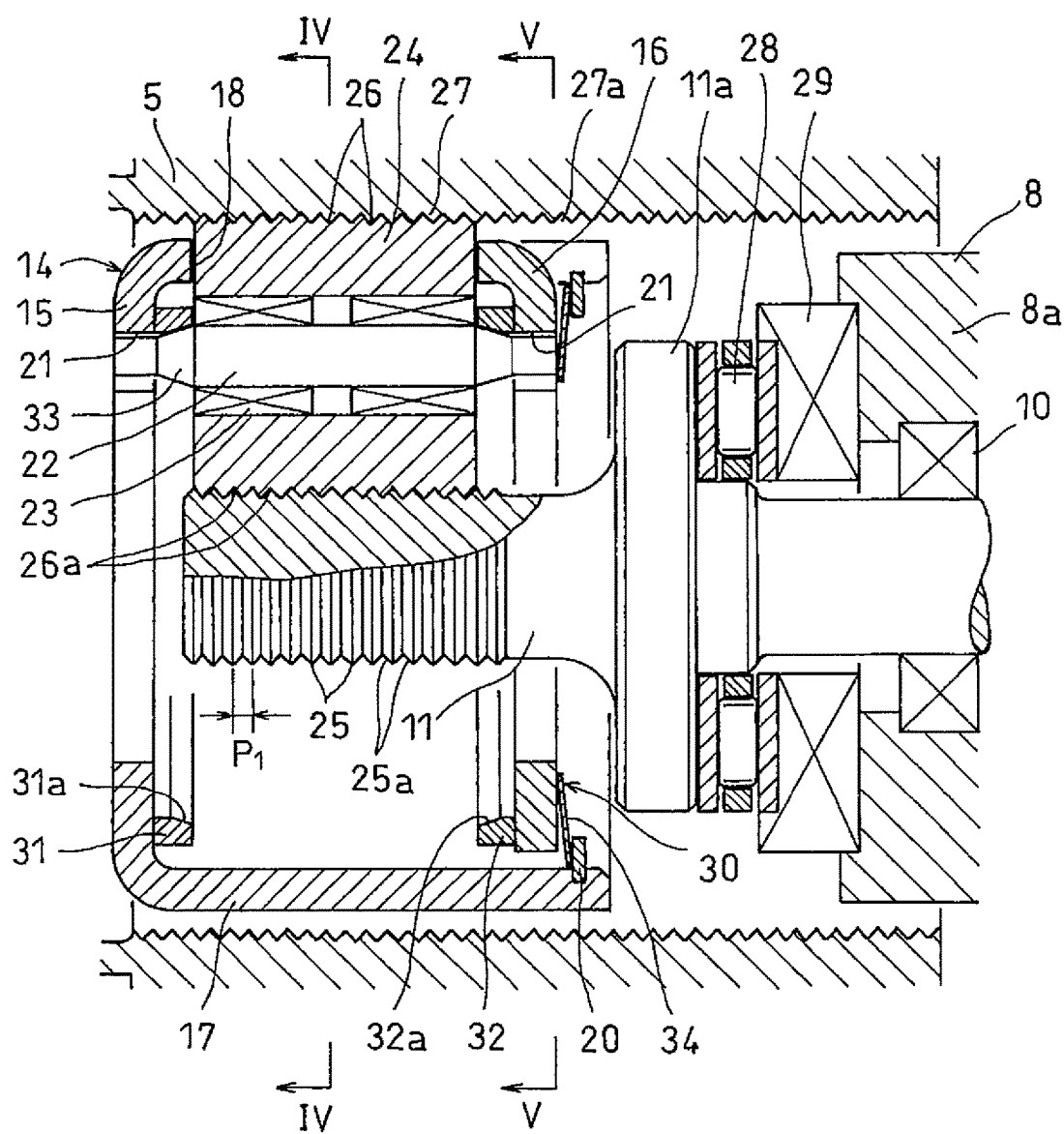
FIG. 2 is a partial enlarged sectional view of FIG. 1.
Figure 7:
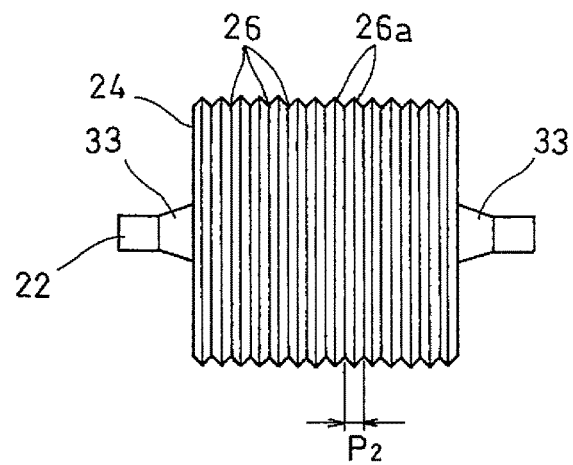
FIG. 7 is a front view of a planetary roller shown in FIG. 1.

As shown in FIG. 2, a plurality of annular ribs 25 are formed on the radially outer surface of the central shafts 11 so as to be axially equidistantly spaced apart from each other. As shown in FIG. 7, a plurality of annular grooves 26 are formed on the radially outer surface of each of the planetary rollers 24, with a pitch $P_2$ which is equal to the pitch $P_1$ of the annular ribs 25. The annular ribs 25 are engaged in and kept in contact with the annular grooves 26.

Figure 6:
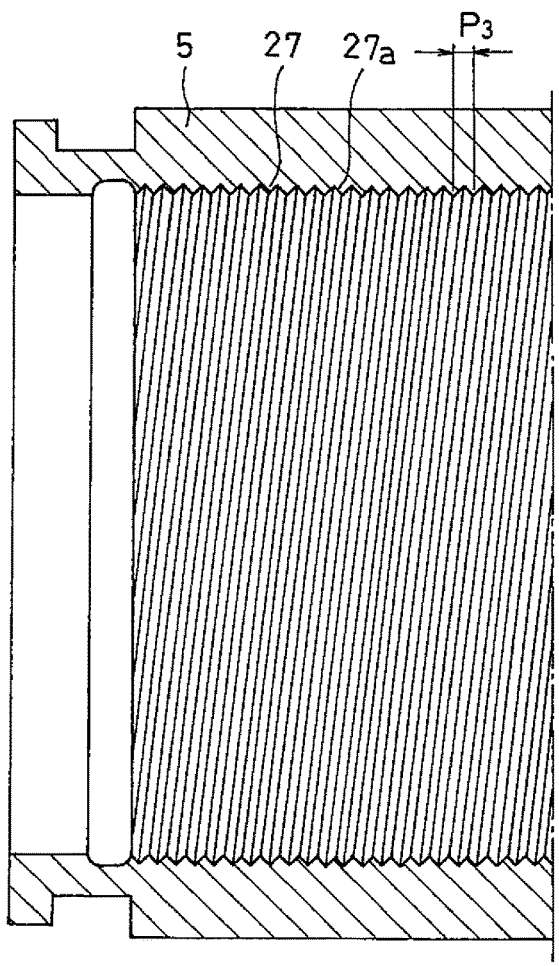
FIG. 6 is a sectional view of a portion of an outer ring member shown in FIG. 1.

As shown in FIG. 6, helical ribs 27 are formed on the radially inner surface of the outer ring member 5, with a pitch $P_3$ which is equal to the pitch $P_2$ of the annular groove 26. The helical ribs 27 are engaged in and kept in contact with the annular grooves 26. The number of the helical ribs 27 is equal to the number of the planetary rollers 24.

As shown in FIGS. 2, 6 and 7, the annular ribs 25, annular grooves 26, and helical ribs 27 have V-shaped sections formed by opposed inclined surfaces 25a, 26a and 27a, respectively. With this arrangement, when an axial load is applied to the outer ring member 5, the planetary rollers 24 are pressed against the radially outer surface of the central shaft 11 under the radial component of the load applied to the planetary rollers 24.

The inclined surfaces 25a, 26a and 27a are preferably convex curved surface to prevent the annular ribs 25 or the helical ribs 27 from coming into contact with the annular grooves 26 at the distal or proximal ends of the respective inclined surfaces, thereby preventing abnormal wear of, or damage to, the inclined surfaces. For this purpose, however, only the inclined surfaces 26a of the planetary rollers 24, or only the inclined surfaces 25a and 27a of the central shaft 11 and the outer ring member 5, may be formed into convex curved surfaces, with the remaining inclined surfaces formed flat.

Figure 5:
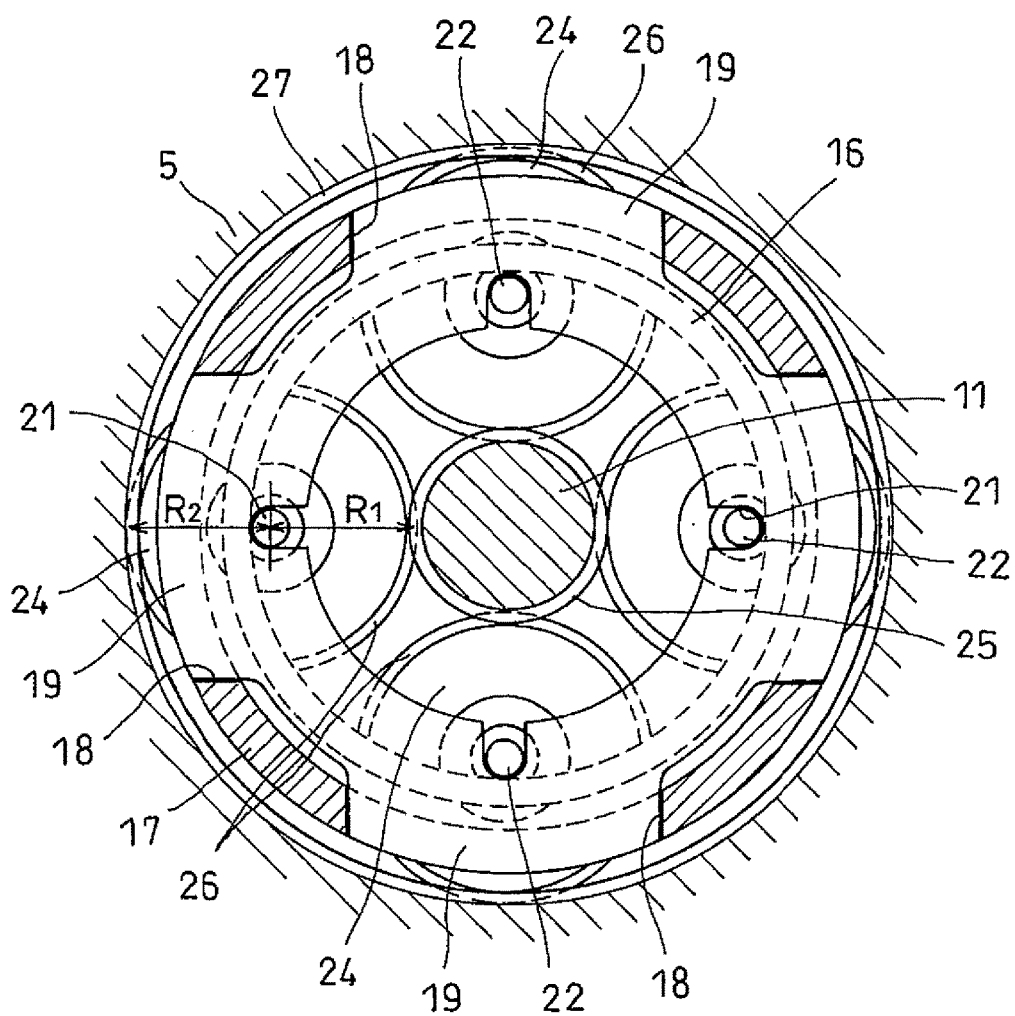
FIG. 5 is a sectional view taken along line V-V of FIG. 2.

As shown in FIG. 5, the contact radius R1 is equal to the contact radius R2, wherein the contact radius R1 is the radius of the portion of each planetary roller 24 that is brought into contact with the central shaft 11, and the contact radius R2 is the radius of the portion of each planetary roller 24 that is brought into contact with the outer ring member 5.

Figure 3:
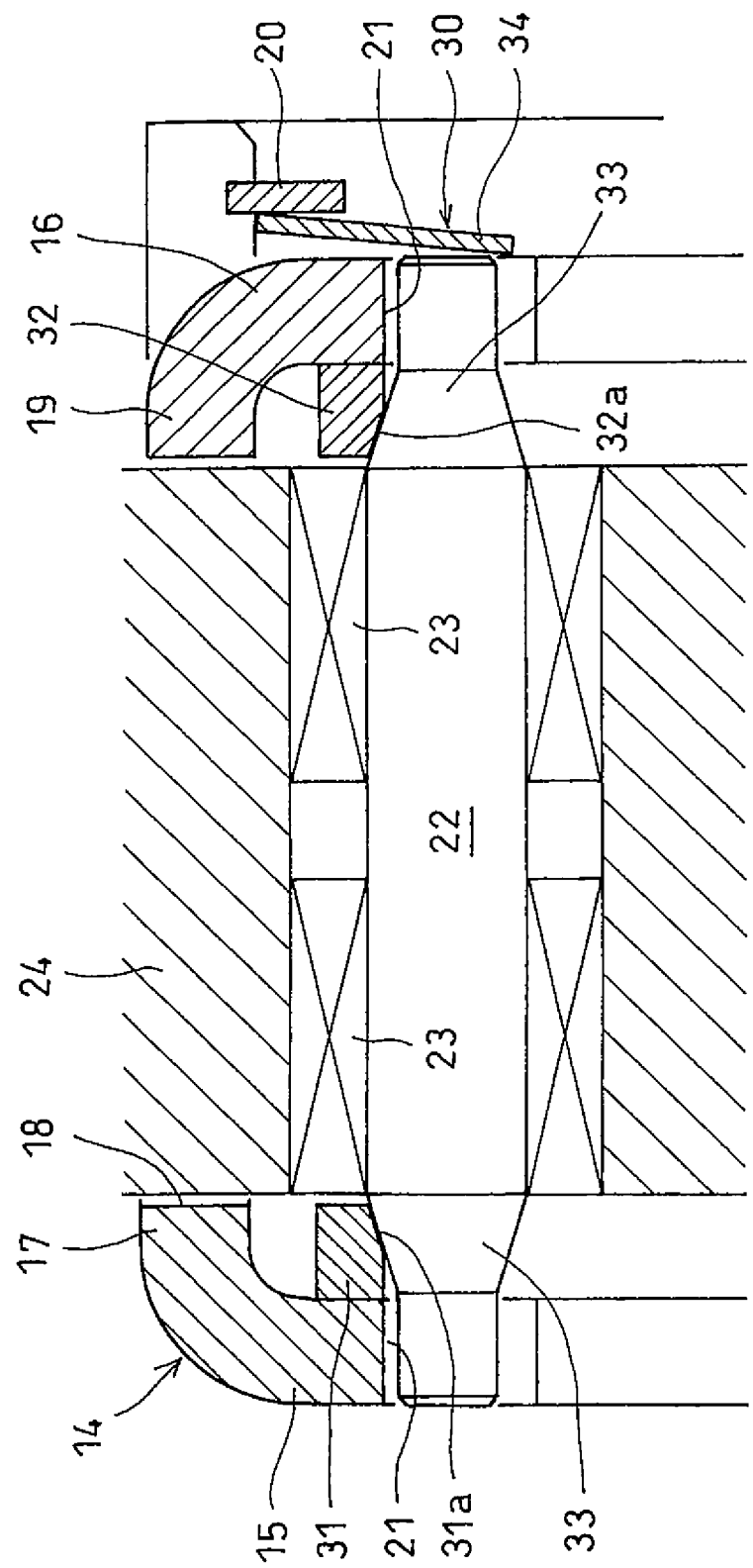
FIG. 3 is a partial enlarged sectional view of FIG. 2.
Figure 4:
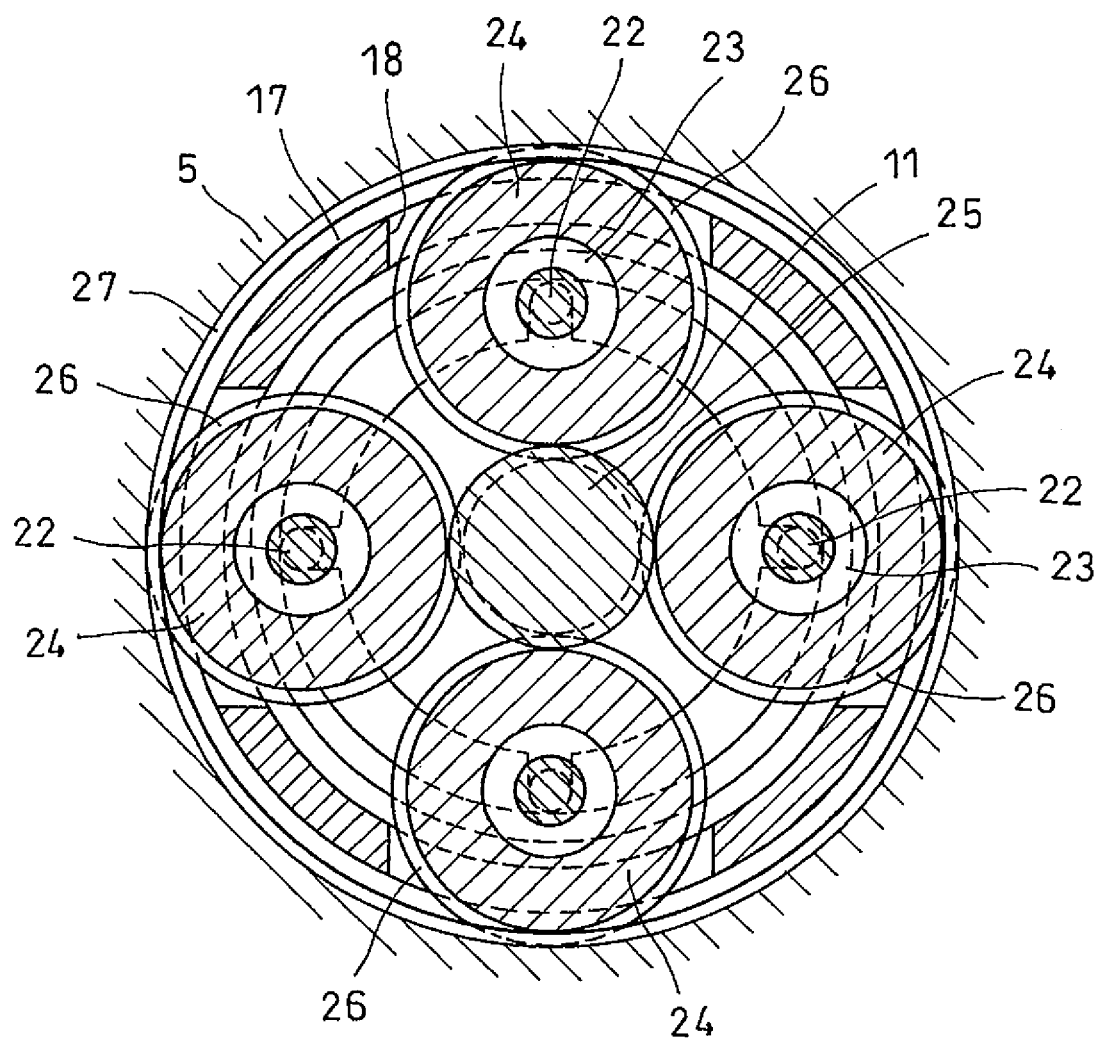
FIG. 4 is a sectional view taken along line IV-IV of FIG. 2.

The planetary rollers 24 are biased against the radially outer surface of the central shaft 11 by a preload applying means 30 shown in FIG. 3 such that a preload is generated at the contact portions between the planetary rollers 24 and the central shaft 11.

The pair of annular plates 15 and 16 of the carrier member 14, which axially face each other and are axially movable relative to each other, have inner side surfaces facing the planetary rollers 24, respectively. The preload applying means 30 includes tapered rings 31 and 32 mounted to the inner side surfaces of the respective annular plates 15 and 16, and tapered shaft portions 33 provided at both ends of the support pins 22, which rotatably support the respective planetary rollers 24, so as to be guided by tapered surfaces 31a and 32a formed on the inner peripheries of the respective tapered rings 31 and 32. The preload applying means 30 further includes an elastic member 34 mounted between the movable annular plate 16 and the snap ring 20, and biasing the tapered ring 32 toward the other tapered ring 31 through the annular plate 16.

The elastic member 34 is a disk spring in the embodiment, but may be a coil spring instead.

As shown in FIG. 2, the central shaft 11 is provided with a flange 11a axially facing the shaft support member 8. A thrust bearing 28 and a load sensor 29 are mounted between the opposed portions of the flange 11a and the shaft support member 8. The thrust bearing 28 supports axial loads applied to the central shaft 11. The load sensor 29 measures such axial loads.

Figure 12:
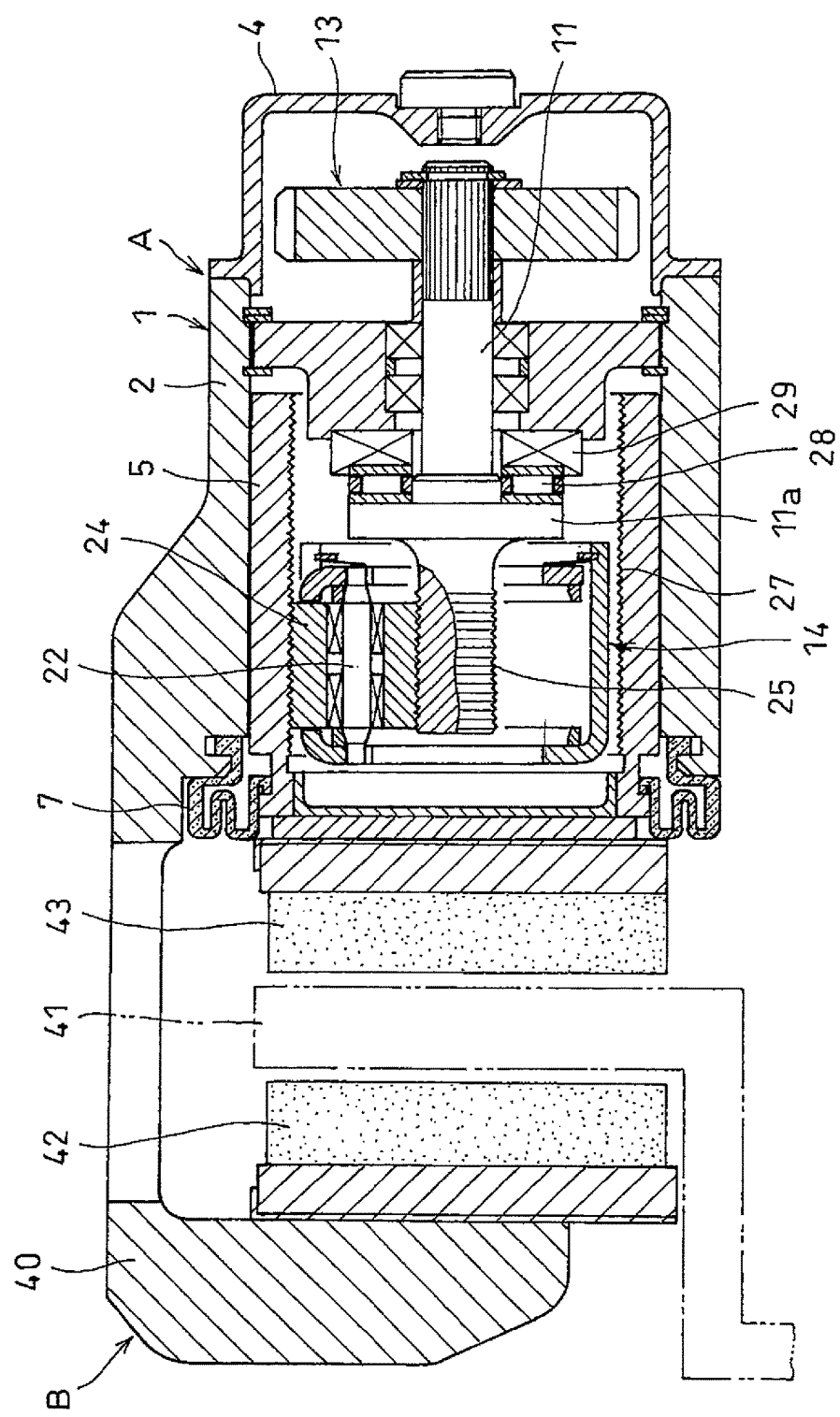
FIG. 12 is a vertical sectional view of an electric disk brake system embodying the present invention.

FIG. 12 shows an electric disk brake system B in which the electric linear motion actuator A of the above embodiment is used. The electric disk brake system B includes a caliper body 40 integrally provided at the other end of the guide tube 2 of the housing 1 of the electric linear motion actuator A. The housing 1 is axially movably supported by a knuckle of a wheel by means of a support member, not shown. The brake system B further includes a disk rotor 41 disposed such that its radially outer portion can pass through the interior of the caliper body 40, and brake pads 42 and 43. The brake pad 43 is kept in contact with the other end of the outer ring member 5.

In the electric disk brake system B shown in FIG. 12, in which the electric linear motion actuator A is mounted, when the electric motor 12, shown in FIG. 1, is driven, the rotation of the rotor shaft 12a is transmitted to the central shaft 11 after being reduced in speed by the gear transmission mechanism 13, so that the central shaft 11 is rotated at a reduced speed.

Since the annular ribs 25 formed on the central shaft 11 are fitted in and kept in contact with the annular grooves 26 formed on the radially outer surfaces of the planetary rollers 24, when the central shaft 11 is rotated, the planetary rollers 24 revolve around the central shaft 11 without axially moving, while rotating about the respective axes of the planetary rollers 24. Since the annular ribs 25 and the annular grooves 26 are in contact with each at the inclined surfaces 25a and 26a, and further, the planetary rollers 24 are biased against the radially outer surface of the central shaft 11 by the preload applying means 30, the planetary rollers 24 can revolve around the central shaft 11 while rotating about their respective axes, without slipping.

Since the annular grooves 26 of the planetary rollers 24 and the helical ribs 27 formed on the radially inner surface of the outer ring member 5 are fitted to each other and kept in frictional contact with each other, the outer ring member 5 is moved in the axial direction when the planetary rollers 24 revolve around the central shaft 11.

Since, as shown in FIG. 5, the contact radius R1, i.e. the radius of the portion of each planetary roller 24 that is brought into contact with the central shaft 11, is equal to the contact radius R2, i.e. the radius of the portion of each planetary roller 24 that is brought into contact with the outer ring member 5, slippage occurs at neither of the above contact portions. Thus, the revolution of the planetary rollers 24 around the central shaft 11 can be efficiently converted to an axial movement of the outer ring member 5. When the outer ring member 5 is moved in the axial direction, the brake pad 43 is moved in a straight line together with the outer ring member 5 and pressed against the disk rotor 41. As a result, the reaction force to the force with which the brake pad 43 is pressed against the disk rotor 41 causes the housing 1 to be moved rightwardly in FIG. 12, which results in the disk rotor 41 being pressed by the brake pads 42 and 43 from both sides, so that a braking force is generated.

When the brake pad 43, which is movable, is pressed against the disk rotor 41, the reaction force to this pressing force is applied to the outer ring member 5 as an axial load. The axial load applied to the outer ring member 5 is then transmitted from the outer ring member 5 to the planetary rollers 24. Since the annular ribs 25 of the central shaft 11 are fitted in the annular grooves 26 of the planetary rollers 24, the axial load applied to the planetary rollers 24 is received at the contact portions between the annular ribs 25 and the annular grooves 26, so that the planetary rollers 24 are prevented from axial movement by the axial load.

Since axial loads applied to the planetary rollers 24 are supported by the fitting portions of the annular grooves 26 and the annular ribs 25, it is not necessary to use thrust bearings to rotatably support the planetary rollers 24. By dispensing with thrust bearings for supporting the planetary rollers, it is possible to reduce the cost and size of the linear motion actuator.

The material for the opposed pair of tapered rings 31 and 32 of the preload applying means 30 is not limited. They may be made of iron, or if lightness in weight is desired, they may be made of a non-ferrous metal or a resin. They may be formed by pressing, casting, forging or injection molding.

In FIG. 2, the snap ring 20 is used to prevent separation of the annular plate 16. However, different means may be used for this purpose. For example, the open end of the cylindrical portion 17 may be crimped inwardly.

In FIG. 2, a preload is applied to the contact portions between the planetary rollers 24 and the central shaft 11 by the two tapered rings 31 and 32. However, a different preload applying means 30 may be used.

FIGS. 8 to 11 show different preload applying means 30. The preload applying means 30 shown in FIGS. 8(a) and 8(b) includes an opposed pair of annular plates 50a and 50b provided at first axial ends of the planetary rollers 24 and at the opposite second axial ends of the planetary rollers 24, respectively, so as to be movable relative to each other. Each of the annular plates 50a and 50b has radially elongated guide holes 51 formed in the radially inner surface thereof. Support pins 52 extend through the center holes of the respective planetary rollers 24, thereby rotatably supporting the planetary rollers 24, with their both ends slidably fitted in the respective guide holes 51. The end portions of the support pins 52 supported by the respective guide holes 51 are each formed with a tapered surface 53. Each of the guide holes 51 is formed with a tapered surface 54 on its closed end surface. The preload applying means further includes an elastic member 55 biasing the annular plate 50b toward the other annular plate 50a, thereby inwardly biasing the planetary rollers 24 due to contact of the tapered surfaces 53 with the tapered surfaces 54.

The pair of annular plates 50a and 50b are slidably fitted in a guide tube 56 formed with pockets 57 in which the respective planetary rollers 24 can be received. Each of the annular plates 50a and 50b has guide pieces 58 formed on the outer periphery thereof and slidably received in the respective pockets 57 such that the annular plates 50a and 50b are movable relative to each other. The guide pieces 58 of the annular plate 50a abut the closed ends of the respective pockets 57 to prevent separation of the annular plate 50a. A snap ring 59 is mounted to the inner periphery of the guide tube 56 at the one end thereof to prevent separation of the other annular plate 50b.

In the preload applying means 30 shown in FIGS. 8(a) and 8(b), both the support pins 52 and the guide holes 51 have tapered surfaces, i.e. tapered surfaces 53 and 54. However, such tapered surfaces may be formed only on the support pins 52 or only on the guide holes 51.

The preload applying means 30 shown in FIGS. 9(c) and 9(d) includes an opposed pair of tapered rings 60a and 60b provided at first axial ends of the planetary rollers 24 and at the opposite second axial ends of the planetary rollers 24, respectively, so as to be movable relative to each other. This preload applying means 30 further includes tapered shaft portions 62 integrally provided at both axial end surfaces of the planetary rollers 24 so as to be guided by, while being kept in contact with, tapered surfaces 61 formed on the inner peripheries of the tapered rings 60a and 60b; and an elastic member 63 biasing the tapered ring 60b toward the other tapered ring 60a, thereby biasing the planetary rollers 24 toward the central shaft 11 due to contact of the tapered shaft portions 62 with the tapered surfaces 61.

The tapered rings 60a and 60b are received in a guide tube 64 formed with pockets 65 in which the respective planetary rollers are received, and rotatably supported by respective bearings 66 so as to be movable relative to each other. The guide tube 64 has an inwardly extending flange 64a at one end thereof. Guide holes 69 in the form of cutouts are formed in the radially inner surface of the flange 64a. Guide holes 69 in the form of cutouts are also formed in the radially inner surface of an annular plate 68 slidably and inseparably inserted in the guide tube 64 at the other end thereof. Straight shaft portions 62a are provided at the ends of the respective tapered shaft portions 62, and are slidably supported in the respective guide holes 69. The elastic member 63 biases the tapered ring 60b toward the other tapered ring 60a through the annular plate 68.

The preload applying means 30 shown in FIGS. 10(e) and 10(f) includes an opposed pair of annular plates 70 and 71 at first axial ends of the planetary rollers 24 and at the opposite second axial ends of the planetary rollers 24, respectively, so as to be movable relative to each other. Tapered pins 73 are provided on each of the annular plates 70 and 71 and inserted in tapered holes 72 formed in the axial end surfaces of the respective planetary rollers 24 so as to rotatably support the planetary rollers 24. The preload applying means 30 further includes an elastic member 74 biasing the annular plate 71 toward the other annular plate 70, thereby biasing the planetary rollers 24 toward the central shaft 11 due to contact of the tapered pins 73 with the tapered holes 72.

The annular plate 70 has on its outer periphery a cylindrical portion 70a. The annular plate 71 is slidably fitted in the cylindrical portion 70a, and is prevented from separation by a snap ring 75 mounted on the inner periphery of the cylindrical portion 70a at its open end. The cylindrical portion 70a is formed with pockets 76 in which the respective planetary rollers 24 are received.

For the preload applying means 30 shown in FIGS. 10(e) and 10(f), each of the annular plates 70 and 71 has a bearing hole 77 in which a bearing 78 is mounted through which the tapered pin 73 is rotatably supported. However, the tapered pins 73 may be rotationally stationary.

Figure 8:
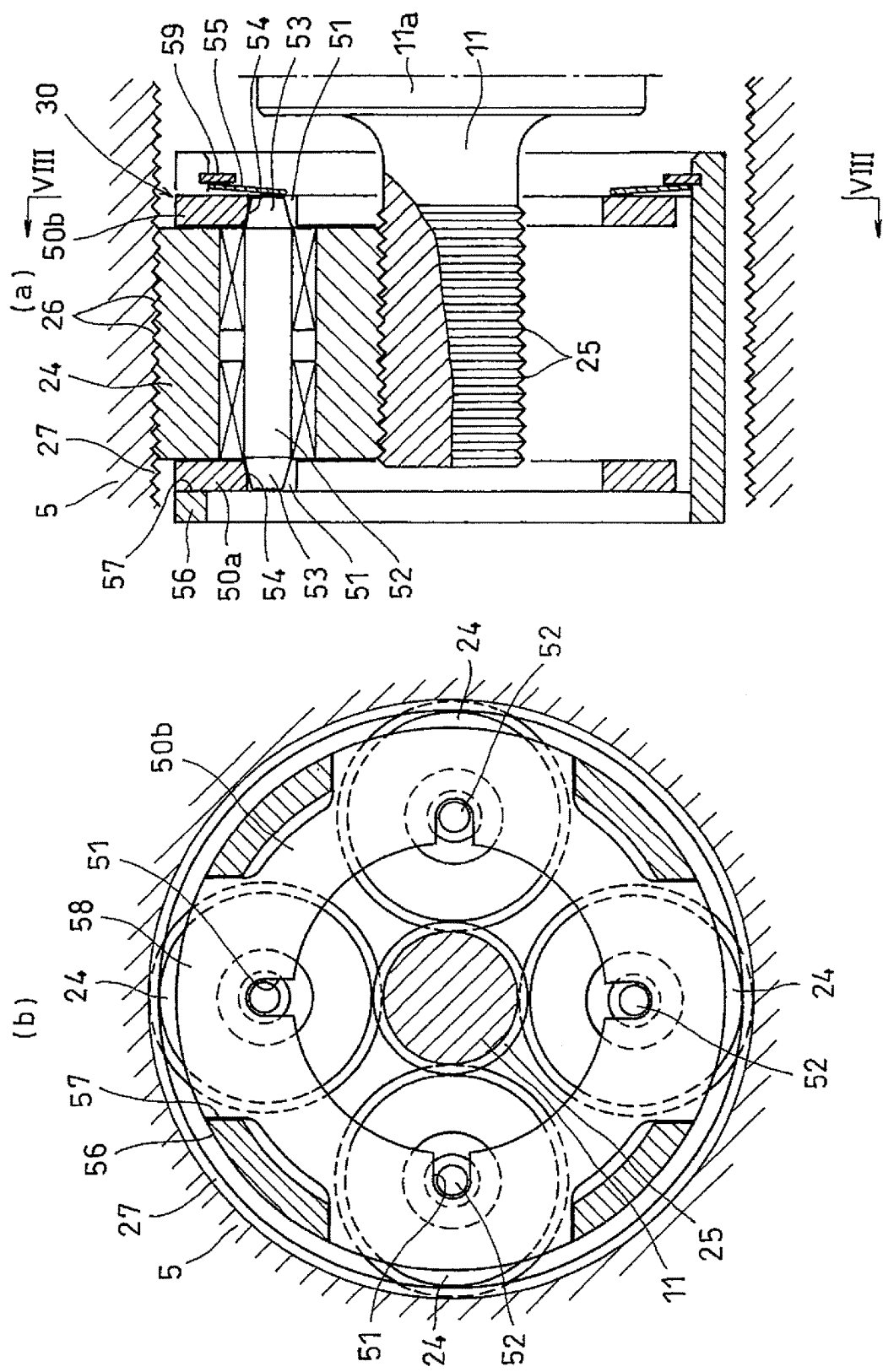
FIG. 8($a$) is a vertical sectional view showing a different preload applying means.
Figure 9:
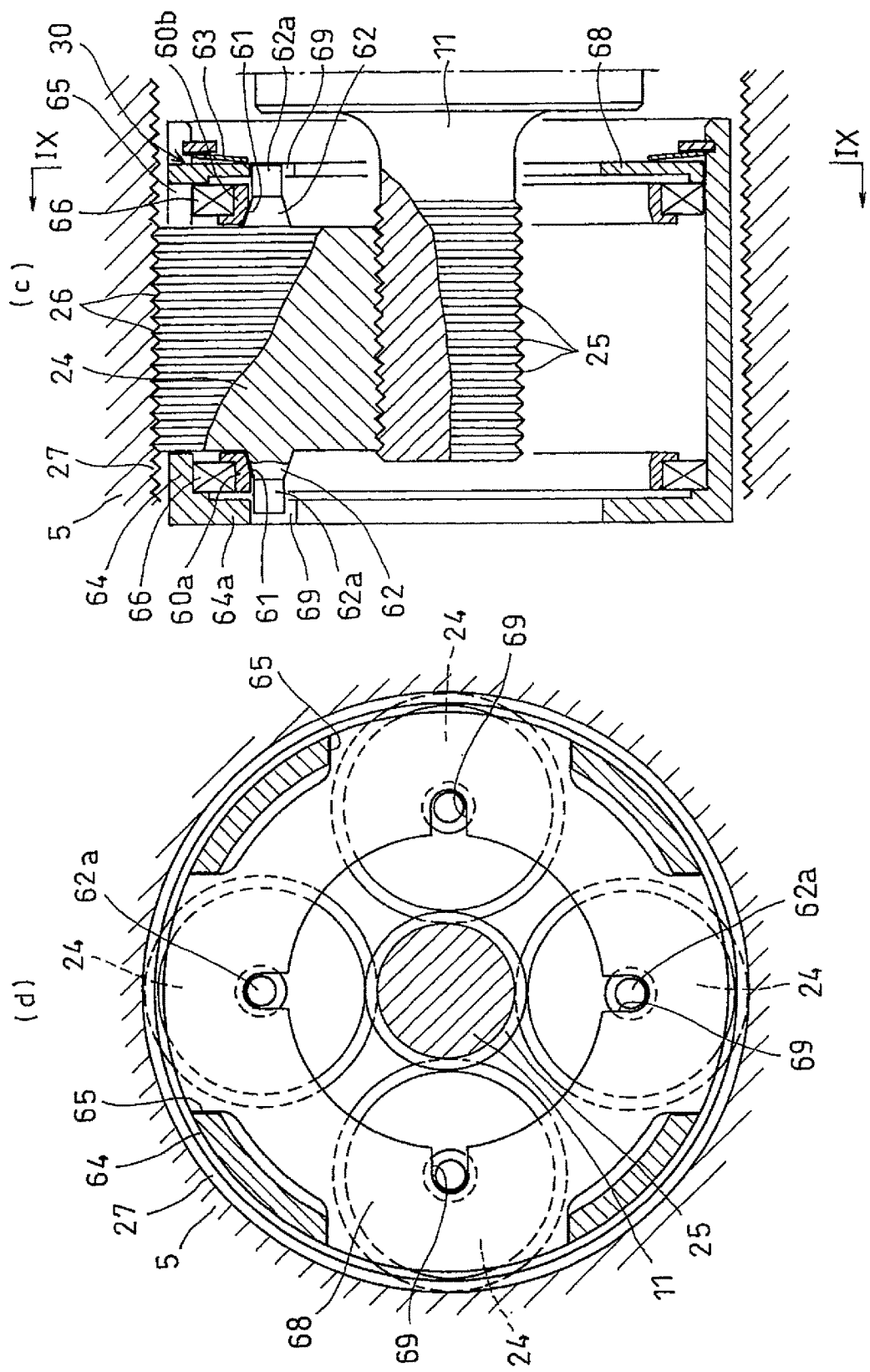
FIG. 9($c$) is a vertical sectional view showing a still different preload applying means.
Figure 10:
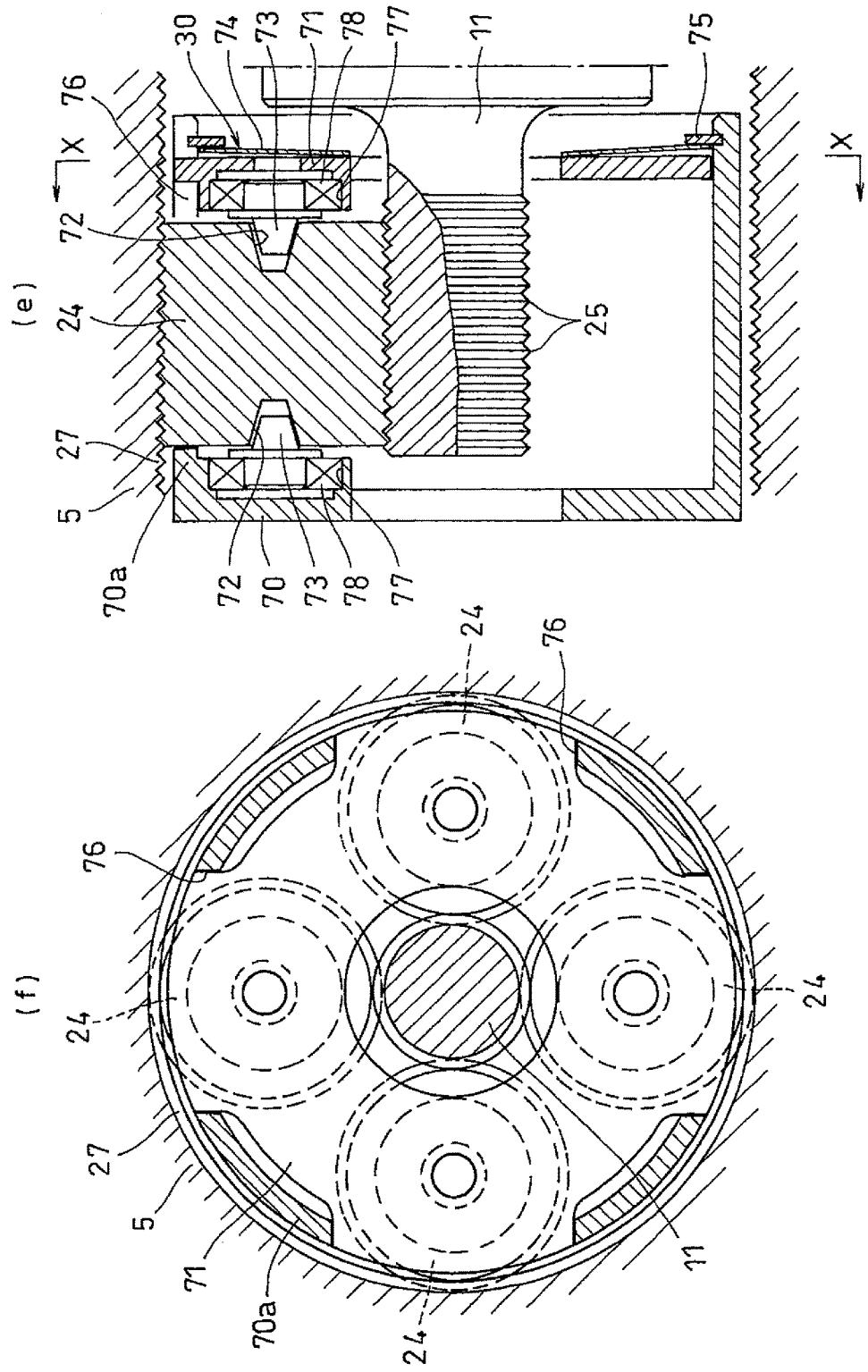
FIG. 10($e$) is a vertical sectional view showing a still different preload applying means.
Figure 11:
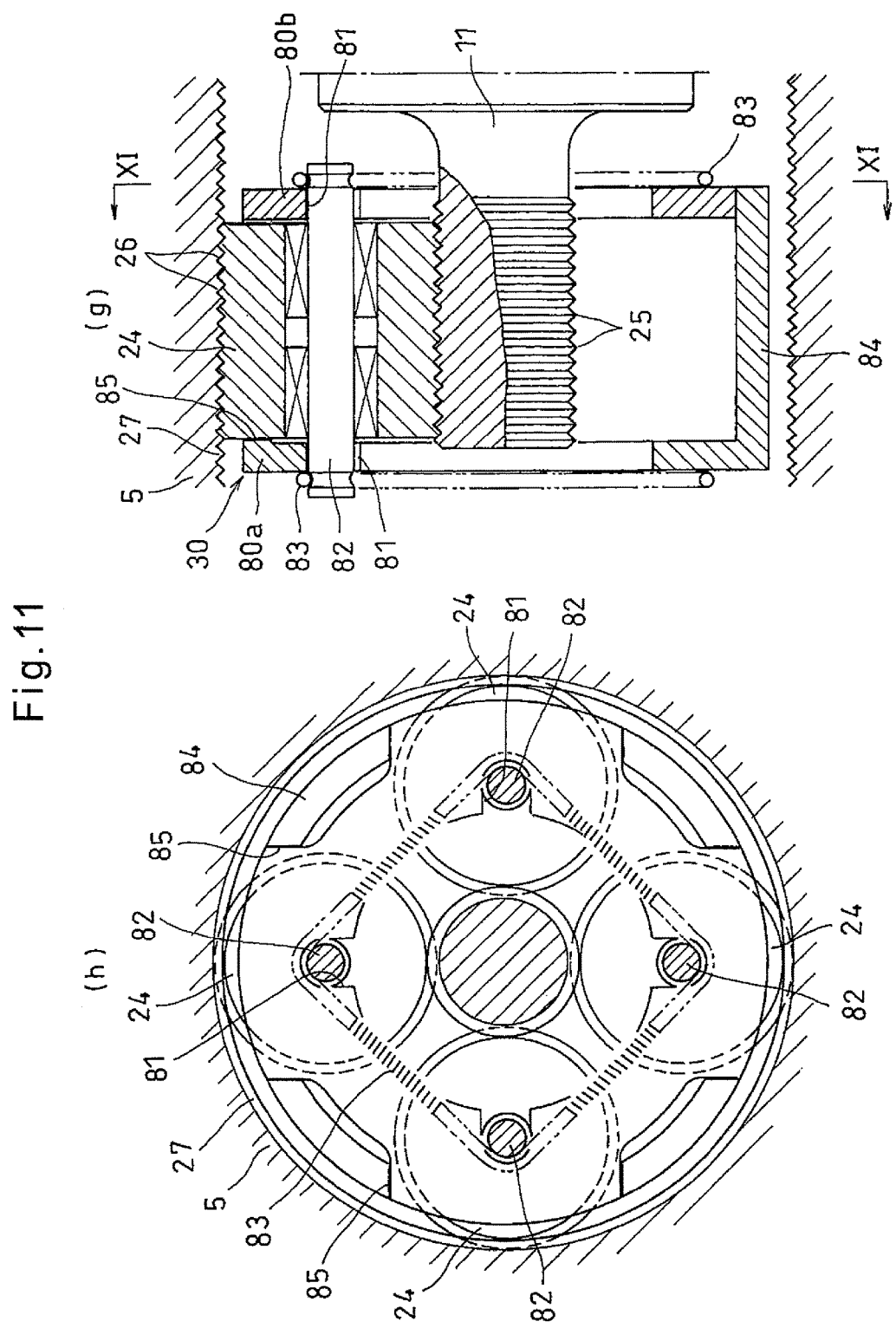
FIG. 11($g$) is a vertical sectional view showing a still different preload applying means.

In the preload applying means shown in FIGS. 8 to 10, disk springs are used as the elastic members. However, coil springs may be used instead.

The preload applying means 30 shown in FIGS. 11(g) and 11(h) includes an opposed pair of annular plates 80a and 80b provided at first axial ends of the planetary rollers 24 and at the opposite second axial ends of the planetary rollers 24, respectively, and each having guide holes 81 in the form of radially elongated cutouts formed in the radially inner surface thereof. Support pins 82 are inserted in the center holes of the respective planetary rollers 24, and have their respective ends slidably received in the guide holes 81. The preload applying means 30 further includes ring-shaped elastic members 83 comprising coil springs wrapped around first ends of the support pins 82 and the opposed second ends of the support pins 82, respectively, thereby biasing the planetary rollers 24 toward the central shaft 11. The elastic members 83 may comprise ring springs extending a portion of the circumference.

The annular plate 80a includes a cylindrical portion 84 at its outer periphery. The other annular plate 80b is fixedly fitted in the cylindrical portion 84 at its open end. The cylindrical portion 84 is formed with pockets 85 in which the respective planetary rollers 24 are received.

In each of the electric linear motion actuators shown in FIGS. 1 to 11, the annular ribs 25 are formed on the radially outer surface of the central shaft 11; the annular grooves 26 are formed on the radially outer surfaces of the planetary rollers 24; and the helical ribs are formed on the radially inner surface of the outer ring member 5. Alternatively, however, a helical rib may be formed on the radially outer surface of the central shaft 11; and a helical groove may be formed on the radially outer surface of each planetary roller 24 so as be equal in pitch and lead angle and opposite in helix direction, to the helical rib formed on the central shaft. In this case, the outer ring member 5 is formed, on the radially inner surface thereof, with a helical rib which is equal in pitch to, and different in lead angle from, the helical grooves formed on the planetary rollers 24, or with annular ribs which are equal in pitch to the helical grooves formed on the planetary rollers. With this arrangement too, when the central shaft 11 is rotated, the planetary rollers 24 revolve around the central shaft 11 while rotating about their respective axes without moving axially, so that the outer ring member 5 is moved in the axial direction due to the revolution of the planetary rollers 24.

In each of the electric linear motion actuators shown in FIGS. 1 to 11, the central shaft 11 is driven by the electric motor 12 and thus serves as an input member, while the outer ring member 5 serves as an output member. Instead, however, the outer ring member 5 may be driven, as an input member, by the electric motor 12, and the central shaft 11 may be used as an output member.

In the latter case, the outer ring member 5 is formed, on the radially inner surface thereof, with a plurality of annular ribs that are equal in pitch, or a helical rib, while each planetary roller 24 is formed, on the radially outer surface thereof, with annular grooves which are equal in pitch to the annular ribs of the outer ring member and in which the annular ribs of the outer ring member are engaged, or with a helical groove which is equal in pitch and lead angle, and opposite in helix direction, to the helical rib of the outer ring member and in which the helical rib of the outer ring member is engaged. Further, the central shaft 11 is formed, on the radially outer surface thereof, with a helical rib which is equal in pitch to the annular grooves of the planetary rollers or equal in pitch to, and different in lead angle from, the helical grooves of the planetary rollers, or annular ribs which are equal in pitch to the helical grooves of the planetary rollers.

DESCRIPTION OF THE NUMERALS

A. Electric linear motion actuator
B. Electric disk brake system
5. Outer ring member
11. Central shaft
22. Support pin
24. Planetary roller
25. Annular rib
25a. Inclined surface
26. Annular groove
26a. Inclined surface
27. Helical rib
27a. Inclined surface
30. Preload applying means
31. Tapered ring
31a. Tapered surface
32. Tapered ring
32a. Tapered surface
33. Tapered shaft portion
34. Elastic member
41. Disk rotor
43. Movable brake pad
50a. Annular plate
50b. Annular plate
52. Support pin
53. Tapered surface
54. Tapered surface
55. Elastic member
60a. Tapered ring
60b. Tapered ring
61. Tapered surface
62. Tapered shaft portion
63. Elastic member
70. Annular plate
71. Annular plate
72. Tapered hole
73. Tapered pin
74. Elastic member
80a. Annular plate
80b. Annular plate
81. Guide hole
82. Support pin
83. Elastic member

What is claimed is:
1. An electric linear motion actuator comprising:
a central shaft,
an outer ring member provided around the central shaft,
a plurality of planetary rollers disposed between the central shaft and the outer ring member, a first one of the central shaft and the outer ring member serving as an input member rotatable and immovable in an axial direction and configured to be rotated by an electric motor, a second one of the central shaft and the outer ring member serving as an output member rotationally stationary and movable in the axial direction, and a preload applying arrangement configured to bias the planetary rollers against a peripheral surface of the input member, thereby applying a preload at contact portions between the planetary rollers and the input member, wherein the input member has a peripheral surface formed with a plurality of annular ribs which are equal in pitch, wherein each of the planetary rollers has a radially outer surface formed with annular grooves which are equal in pitch to the annular ribs of the input member, and in which the annular ribs of the input member are engaged, wherein the output member has a peripheral surface which is formed with a helical rib which is equal in pitch to the annular grooves of each of the planetary rollers, wherein the preload applying arrangement comprises:
an opposed pair of annular members including a first annular member at first axial ends of the planetary rollers and a second annular member at a second axial ends of the planetary rollers so as to be movable relative to each other, and
an elastic member configured to bias the annular members toward each other,
wherein at least one of:
(i) each of the first axial ends and the second axial ends of the planetary rollers have tapered surfaces, and wherein the planetary rollers and the annular members are configured to be pressed against each other along the axial direction by the elastic member such that each of the tapered surfaces converts an axial biasing force applied by the elastic member against the annular members to a radial biasing force applied by the annular members against the planetary rollers, and
(ii) each of the annular members has a tapered surface, and wherein the planetary rollers and the annular members are configured to be pressed against each other along the axial direction by the elastic member such that each of the tapered surfaces converts an axial biasing force applied by the elastic member against the annular members to a radial biasing force applied by the annular members against the planetary rollers.

2. The electric linear motion actuator of claim 1, wherein each of the planetary rollers has a first portion brought into contact with the input member and a second portion brought into contact with the output member, and wherein the first portion has a radius equal to a radius of the second portion.

3. The electric linear motion actuator of claim 1, wherein the annular grooves of each of the planetary rollers have inclined side surfaces which are configured to create radial components from an axial load applied to the output member, the radial components tending to press the respective planetary rollers against the input member.

4. An electric disk brake system comprising an electric linear motion actuator which linearly drives a brake pad to press the brake pad against a disk rotor, thereby applying a braking force to the disk rotor,
wherein the electric linear motion actuator comprises the electric linear motion actuator of claim 1.

5. The disk brake system of claim 4, further comprising a thrust bearing configured to support an axial load applied from the output member to the input member through the planetary rollers when a braking force is applied to the disk rotor, and a load sensor provided axially adjacent the thrust bearing.

6. An electric linear motion actuator comprising:
a central shaft,
an outer ring member provided around the central shaft, and
a plurality of planetary rollers disposed between the central shaft and the outer ring member, a first one of the central shaft and the outer ring member serving as an input member rotatable and immovable in an axial direction and configured to be rotated by an electric motor, a second one of the central shaft and the outer ring member serving as an output member rotationally stationary and movable in the axial direction, and
a preload applying arrangement pressing the planetary rollers against the peripheral surface of the input member, thereby applying a preload to a contact portion between each of the planetary rollers and the input member,
wherein the input member has a peripheral surface formed with a plurality of annular ribs which are equal in pitch, or a helical rib,
wherein each of the planetary rollers has a radially outer surface formed with annular grooves which are equal in pitch to the annular ribs of the input member, and in which the annular ribs of the input member are engaged, or formed with a helical groove which are equal in pitch and lead angle, and opposite in helix direction, to the helical rib of the input member, and in which the helical rib of the input member is engaged, and
wherein the output member has a peripheral surface which is formed, if the annular grooves are formed on the radially outer surfaces of the planetary rollers, with a helical rib which is equal in pitch to the annular grooves of the planetary rollers, and if the helical grooves are formed on the radially outer surfaces of the planetary rollers, with a helical rib which is equal in pitch to, and different in lead angle from, the helical grooves of the planetary rollers, or with annular ribs which are equal in pitch to the helical grooves of the planetary rollers,
wherein the preload applying arrangement comprises:
an opposed pair of tapered rings including a first tapered ring at first axial ends of the planetary rollers and a second tapered ring at second axial ends of the planetary rollers so as to be movable relative to each other, each of the tapered rings having a tapered peripheral surface facing the input member;
first tapered shaft portions at respective first axial ends of support pins inserted through center holes of the planetary rollers, the first tapered shaft portions being kept in contact with and guided by the tapered peripheral surface of the first tapered ring;
second tapered shaft portions at respective second axial ends of the support pins and kept in contact with and guided by the tapered peripheral surface of the second tapered ring; and
an elastic member configured to bias the tapered rings toward each other,
wherein the tapered rings, first tapered shaft portions, and second tapered shaft portions are configured to convert an axial biasing force applied by the elastic member against the tapered rings to a radial biasing force applied by the tapered rings against the planetary rollers.

7. The electric linear motion actuator of claim 6, wherein the elastic member comprises a disk spring or a coil spring.

8. An electric linear motion actuator comprising:
a central shaft,
an outer ring member provided around the central shaft,
a plurality of planetary rollers disposed between the central shaft and the outer ring member, a first one of the central shaft and the outer ring member serving as an input member rotatable and immovable in an axial direction and configured to be rotated by an electric motor, while a second one of the central shaft and the outer ring member serving as an output member rotationally stationary and movable in the axial direction, and
a preload applying arrangement configured to bias the planetary rollers against a peripheral surface of the input member, thereby applying a preload at contact portions between the planetary rollers and the input member,
wherein the input member has a peripheral surface formed with a helical rib,
wherein each of the planetary rollers has a radially outer surface formed with a helical groove equal in pitch and lead angle, and opposite in helix direction, to the helical rib of the input member, the helical rib of the input member being engaged in the helical rib of the planetary rollers, and
wherein the output member has a peripheral surface formed with (i) a helical rib equal in pitch to, and different in lead angle from, the helical groove of each of the planetary rollers, or (ii) annular ribs equal in pitch to the helical groove of each of the planetary rollers, and
wherein the preload applying arrangement comprises:
an opposed pair of annular members including a first annular member at first axial ends of the planetary rollers and a second annular member at a second axial ends of the planetary rollers so as to be movable relative to each other, and
an elastic member configured to bias the annular members toward each other,
wherein at least one of:
(i) each of the first axial ends and the second axial ends of the planetary rollers have tapered surfaces, and wherein the planetary rollers and the annular members are configured to be pressed against each other along the axial direction by the elastic member such that each of the tapered surfaces converts an axial biasing force applied by the elastic member against the annular members to a radial biasing force applied by the annular members against the planetary rollers, and
(ii) each of the annular members has a tapered surface, and wherein the planetary rollers and the annular members are configured to be pressed against each other along the axial direction by the elastic member such that each of the tapered surfaces converts an axial biasing force applied by the elastic member against the annular members to a radial biasing force applied by the annular members against the planetary rollers.

9. The electric linear motion actuator of claim 8, wherein each of the planetary rollers has a first portion brought into contact with the input member and a second portion brought into contact with the output member, and wherein the first portion has a radius equal to a radius of the second portion.

10. The electric linear motion actuator of claim 8, wherein the helical groove of each of the planetary rollers has inclined side surfaces which are configured to create radial components from an axial load applied to the output member, the radial components tending to press the respective planetary rollers against the input member.

11. An electric disk brake system comprising an electric linear motion actuator which linearly drives a brake pad to press the brake pad against a disk rotor, thereby applying a braking force to the disk rotor,
wherein the electric linear motion actuator comprises the electric linear motion actuator of claim 8.

12. The disk brake system of claim 11, further comprising a thrust bearing configured to support an axial load applied from the output member to the input member through the planetary rollers when a braking force is applied to the disk rotor, and a load sensor provided axially adjacent the thrust bearing.

* * * * *